(12) United States Patent
Fisher et al.

(10) Patent No.: US 10,617,276 B2
(45) Date of Patent: Apr. 14, 2020

(54) APPLIANCE CONTROL AND MONITORING SYSTEMS AND METHODS FOR MAKING AND USING SAME

(71) Applicant: TCD PARTS, INC., Edgerton, MO (US)

(72) Inventors: Mark B. Fisher, Edgerton, MO (US); Joel Gross, Gilbert, AZ (US)

(73) Assignee: TCD PARTS, INC., Edgerton, MO (US)

( * ) Notice: Subject to any disclaimer, the term of this patent is extended or adjusted under 35 U.S.C. 154(b) by 0 days.

(21) Appl. No.: 15/792,064

(22) Filed: Oct. 24, 2017

(65) Prior Publication Data

US 2018/0110393 A1    Apr. 26, 2018

Related U.S. Application Data

(60) Provisional application No. 62/411,825, filed on Oct. 24, 2016.

(51) Int. Cl.
| | |
|---|---|
| *A47L 15/00* | (2006.01) |
| *A47L 15/46* | (2006.01) |
| *A47L 15/42* | (2006.01) |
| *G06Q 30/06* | (2012.01) |
| *F25C 1/00* | (2006.01) |

(52) U.S. Cl.
CPC ......... *A47L 15/0063* (2013.01); *A47L 15/006* (2013.01); *A47L 15/4293* (2013.01); *A47L 15/46* (2013.01); *F25C 1/00* (2013.01); *G06Q 30/0645* (2013.01); *A47L 15/0076* (2013.01); *A47L 2401/20* (2013.01); *A47L 2401/34* (2013.01); *A47L 2501/22* (2013.01); *F25C 2600/04* (2013.01)

(58) Field of Classification Search
None
See application file for complete search history.

(56) References Cited

U.S. PATENT DOCUMENTS

| | | | |
|---|---|---|---|
| 2004/0088075 A1* | 5/2004 | Batcher | A47L 15/0063 700/225 |
| 2007/0246071 A1* | 10/2007 | Streb | A47L 15/248 134/18 |
| 2011/0279004 A1* | 11/2011 | Assmann | A47L 15/4259 312/228 |

(Continued)

*Primary Examiner* — Eric W Golightly
(74) *Attorney, Agent, or Firm* — Lathrop GPM LLP

(57) ABSTRACT

A method for remotely monitoring and operating a dishwashing machine includes providing a remote appliance monitoring and control unit. The unit has a portable housing having an indicator, a wireless network interface, a processor, and a memory having machine readable instructions configured to be executed by the processor. The instructions are executed to determine an attribute of the dishwashing machine and to control the indicator based on the determination of the attribute. The method includes communicatively coupling the unit to the dishwashing machine, and using the unit to determine the attribute of the dishwashing machine. The method comprises causing the unit to wirelessly communicate the determined attribute to a remote user computer together with a geographic location of the dishwashing machine. The method includes taking a responsive action in response to the determined attribute.

16 Claims, 6 Drawing Sheets

(56) References Cited

U.S. PATENT DOCUMENTS

2012/0242159 A1* 9/2012 Lou .................... H03H 7/40
                                              307/104
2014/0059435 A1* 2/2014 Kim .................... G05B 15/02
                                              715/721

* cited by examiner

APPLIANCE CONTROL AND MONITORING SYSTEMS AND METHODS FOR MAKING AND USING SAME

CROSS-REFERENCE TO RELATED APPLICATIONS

This application claims priority to U.S. Provisional Patent Application Ser. No. 62/411,825, filed Oct. 24, 2016. The disclosure of the '825 Application is hereby incorporated by reference herein in its entirety.

FIELD OF THE DISCLOSURE

The disclosure relates generally to the field of control systems for appliances. More specifically, the disclosure relates to systems and methods for remotely monitoring and operating commercial appliances, including dishwashers and ice machines.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

The disclosure relates generally to the field of control systems for appliances. More specifically, the disclosure relates to systems and methods for remotely monitoring and operating commercial appliances, including dishwashers and ice machines.

In an embodiment, a method for remotely monitoring and operating a dishwashing machine includes providing a remote appliance monitoring and control unit. The unit has a portable housing having an indicator, a wireless network interface, a processor, and a memory having machine readable instructions configured to be executed by the processor. The instructions are executed to determine an attribute of the dishwashing machine and to control the indicator based on the determination of the attribute. The method includes communicatively coupling the unit to the dishwashing machine, and using the unit to determine the attribute of the dishwashing machine. The method comprises causing the unit to wirelessly communicate the determined attribute to a remote user computer together with a geographic location of the dishwashing machine. The method includes taking a responsive action in response to the determined attribute.

In another embodiment, a method for remotely monitoring and operating a commercial appliance comprises providing a remote appliance monitoring and control unit. The unit has a portable housing having a visible indicator, a wireless network interface, a processor, and a memory having machine readable instructions configured to be executed by the processor. The instructions are executed to determine an attribute of the commercial appliance, and to control the visible indicator based on the determination of the attribute. The method includes communicatively coupling the unit to the commercial appliance, and using the unit to determine the attribute of the commercial appliance. The method comprises causing the unit to wirelessly communicate the determined attribute to a lessor computer together with a geographic location of the commercial appliance. The method includes using the determined attribute to automatically take a responsive action.

In yet another embodiment, a method for remotely monitoring and operating a dishwashing machine comprises providing a remote appliance monitoring and control unit. The unit has a portable housing having an indicator, a wireless network interface, a processor, and a memory having machine readable instructions configured to be executed by the processor to determine an attribute of the dishwashing machine. The instructions also cause the processor to control the indicator based on the determination of the attribute. The method includes hardwiring the unit to the dishwashing machine, and using the unit to determine the attribute of the dishwashing machine. The method comprises causing the unit to wirelessly communicate the determined attribute to a remote user computer. The method includes using the remote computer to control an operation of the dishwashing machine via the unit.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

Figure 1:
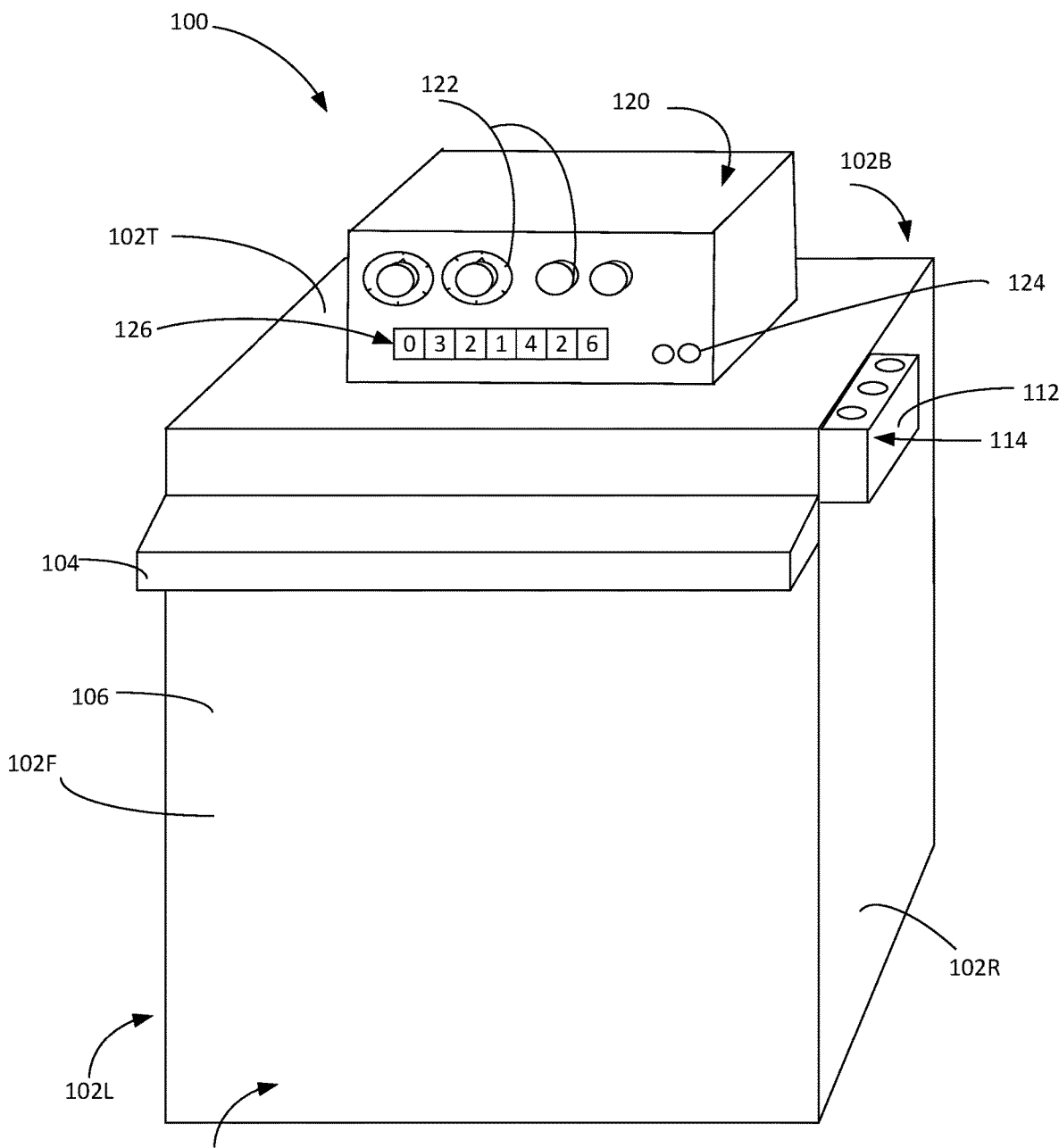
FIG. 1 is a front perspective view of a prior art commercial dishwashing machine.

Embodiments of the present disclosure include systems and methods for remotely monitoring and operating commercial appliances, such as dishwashers, ice machines, et cetera.

Dishwashing systems provide a convenient and efficient alternative to washing dirty dishes by hand and are particularly ubiquitous in commercial settings (e.g., restaurants, bars, hotels, et cetera), where a large number of dirty dishes must be cleaned and sanitized on a regular basis. Generally speaking, commercial dishwashers clean and sanitize dirty dishes as follows. The dirty dishes are first placed, manually or via a conveyer belt, on a rack within the commercial dishwasher. The dishes are then "prewashed", i.e., flushed with cold or warm water under moderate pressure to remove food particles. Next, the dishes are cleaned or washed with a cleaning compound (e.g., by soaking the dishes in the cleaning compound, by spraying the dishes with the cleaning compound, by foaming or jelling, et cetera). After the cleaning process, the dishes are rinsed with clean potable water to remove substantially all traces of the cleaning compound. Finally, the dishes are sanitized to destroy any organisms which may be present on the dishes after the cleaning and rinsing cycles. The dishes are then removed from the rack and are reused as desired.

Commercial dishwashing systems generally utilize either high temperatures or sanitation agents to sanitize the dishes. Using high temperatures (i.e., hot water or steam) to sanitize the dishes has its advantages, as water is generally inexpensive, nontoxic and readily available. However, some organisms may remain alive on the dishes even after being subjected to hours of boiling temperatures. Furthermore, sanitation by high temperatures may be somewhat inefficient, as dishes generally have to be immersed in hot water or treated with steam for at least fifteen minutes to effectuate proper sanitation.

Low temperature dishwashing systems (i.e., dishwashers that use sanitation agents for sanitation), hence, are becoming increasingly popular. These dishwashing systems may employ a chlorine solution as the sanitation agent, as chlorine is effective against a wide variety of microorganisms, is not affected by water hardness, is non-staining, non-film forming, and generally inexpensive. Alternatively, iodophors (i.e., loosely bound complexes of iodine and non-ionic surface active agents) and quaternary ammonium compounds may be used as sanitation agents in low temperature dishwashing systems.

Some commercial entities purchase dishwashing systems for use outright. But, commercial dishwashing systems are expensive and many commercial entities cannot afford to expend the resources required to make such a purchase. Moreover, dishwashing systems may over time require significant maintenance, which too is costly. To minimize these downsides, many commercial entities choose to lease dishwashing systems instead. Indeed, there is an entire industry of lessors (e.g., dish machine dealers and distributors) who purchase (or manufacture, refurbish, et cetera) commercial dishwashing machines and then rent them out to restaurants, hotels, bars, hospitals, senior homes, and other entities. Often, as part of the lease agreement, the lessee also agrees to purchase one or more chemicals required to effectuate the washing of dishes (e.g., soap, sanitation agents, et cetera) from the lessor.

Traditionally, when the lessor leases the commercial dishwasher to the lessee, it retains full ownership rights. The interests of the lessor and the lessee are not always fully aligned. The paramount concern for the lessee is to ensure that the dishwasher functions to wash dishes on command in the short term (e.g., that day), as otherwise, the lessee may lose valuable time, which may lead to financial losses. For instance, where the lessee is an owner of a restaurant, for example, the owner may primarily be concerned with ensuring that the dishwasher functions in the short term (e.g., that day), as otherwise, the lessee may lose customers because the dishwasher is down and the restaurant does not have clean dishes to timely serve the patrons. The lessee is generally not concerned, however, with ensuring that the proper dishwashing liquid for the particular machine is used, or that maintenance is timely performed so that the longevity of the dishwashing machine is not adversely affected in the long run. The lessor, on the other hand, desires to ensure that the dishwashing machines function properly, not just in the short term, but also for years to come. The lessor may therefore send technicians on site periodically (such as once every two to three months) to ensure that dishwashers are being used as intended (e.g., that the chemicals suited to that machine are being employed) and proper maintenance is performed.

Often, the lessor's technicians are not close to the site at which the dishwashing machine is located (e.g., the lessor's technician may have to drive one, two, three, or more hours to tend to a dishwashing machine in a restaurant, bar, or other location). Servicing the dishwashing machines (e.g., driving several hours to check if the dishwashing machine is functioning as intended) may therefore be a costly endeavor, at least in part due to the technician's wasted time.

The lessor's technicians may also have to periodically visit the site(s) at which the commercial dishwashing machines are situated to determine usage of the dishwashing machines. Specifically, the lessors may not charge for the commercial dishwashing machine a flat fee because such flat fees do not account for the actual usage of the dish machine and the resulting wear and tear, which can have impact on the life of the machine and the associated costs for maintenance. Instead, to ensure that usage of the dishwashing machine is taken into account in the lease fees, the lessors may charge the lessees a sum certain per rack (i.e., per cleaning cycle). For example, the lessor may charge the lessee between 2-10 cents per rack. The skilled artisan understands that a commercial dishwasher may have one or more racks (e.g., one rack for glasses, one rack for plates, one rack for bowls, et cetera), and that each rack may be independently operated.

To facilitate monitoring of the dishwasher's usage, the commercial dishwashing machine may have a rack counter, which may count only the total number of racks for which the commercial dishwashing machine has been used; that is, such counters may be akin to odometers in older vehicles, which count only the total number of miles for which the vehicle has been driven since manufacture. The lessor may send a technician to the site every month (or every two weeks, two months, three months, et cetera). The technician may read the rack counter, subtract from the current reading the reading obtained on the previous visit, and thereby determine the number of racks that have been washed since the technician's last visit. This number may then be taken into account by the lessor in charging the lessee the appropriate fees for the particular dishwashing machine.

Figure 2:
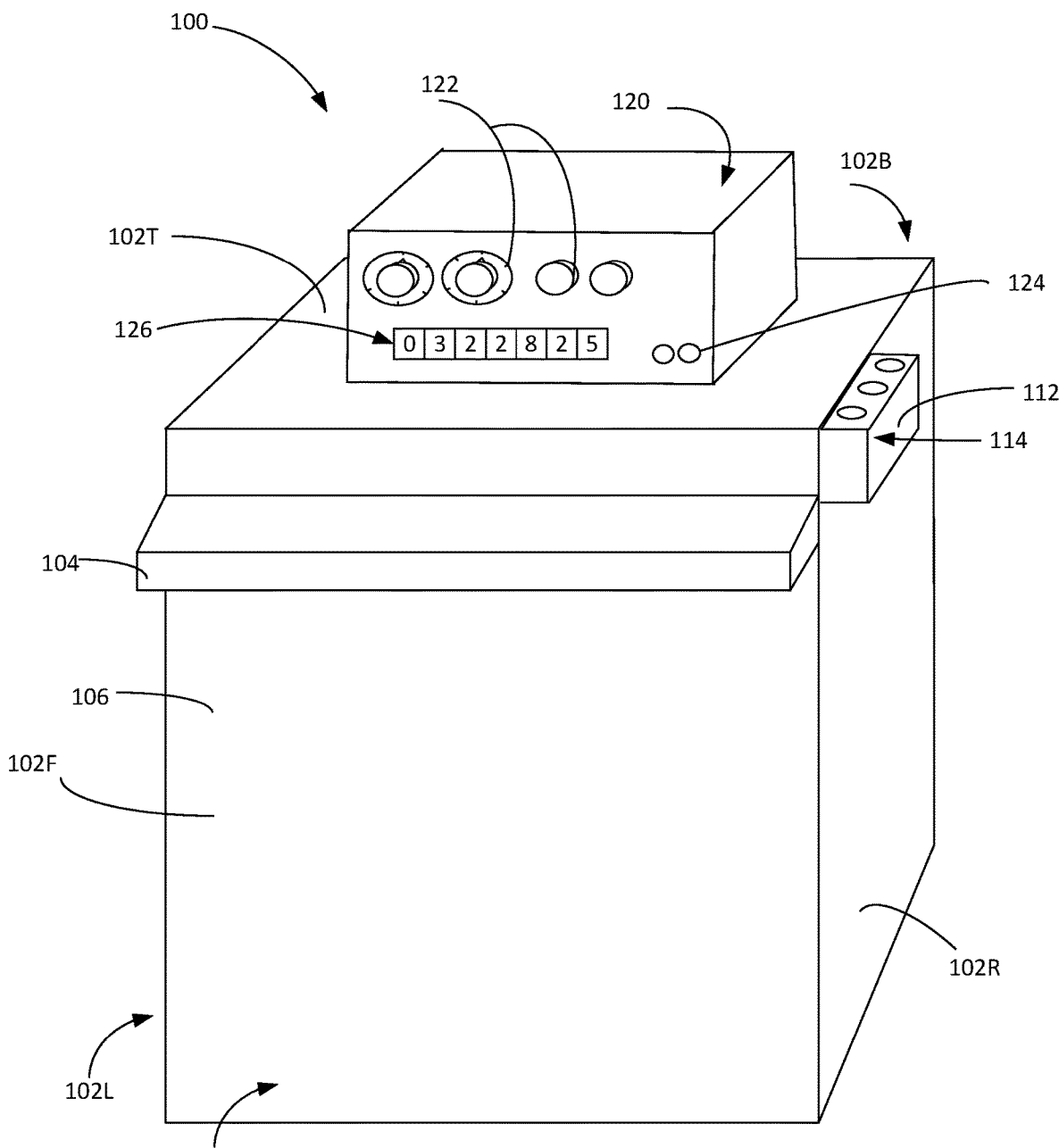
FIG. 2 is another front perspective view of the prior art commercial dishwashing machine of FIG. 1.

To illustrate, consider for example a typical prior art low temperature commercial dishwashing machine 100, as shown in FIGS. 1 and 2. The dishwashing system 100 may have a housing 102H having a front side 102F, a right side 102R, and a top side 102T. While not clearly visible in the figures, the housing 102H of the dishwashing system 100 may also have a left side 102L opposite the right side 102R and a back side 102B opposite the front side 102F. The housing 102H may have at the front side 102F a handle 104 secured to a door 106. The handle 104 may be used to pull the door 106 open to reveal one or more dish racks, which may be filled with dirty dishes that need to be cleaned. A sanitation agent supply vessel 112 (a bucket, box, et cetera) may be adhered to the dishwashing system 100 on the right side 102R of the housing 102H, or elsewhere. The supply vessel 112 may be configured to retain a sanitation agent 114 and other cleaning compounds, and may dispense these cleaning compounds during the sanitation cycles to the dirty dishes via a supply tube (not expressly shown).

The dishwashing system 100 may also have a control housing 120 located on the top side 102T of the machine housing 102H. The control housing 120 may house, for example, electronics, control circuitry, switches and knobs, et cetera, to allow the operation of the machine 100 to be controlled. For example, the control housing 120 may include inputs (i.e., knobs, buttons, et cetera) 122 for allowing users to control the various settings of the dish washing system 100, such as cycle duration, temperature, power on/off, et cetera, and outputs 124 (e.g., lights, cycle alarms, et cetera) to convey information about the workings of the dishwashing system 100 to the users.

The dishwashing system 110 control housing 120 may have a counter 126. The counter 126, as discussed above, may include a running count of the racks washed by the dishwashing machine 100. For example, as shown in FIG. 1, the counter may read 321,426 on Oct. 1, 2016, indicating that the machine 100 has been used to clean 321,426 racks of dirty dishes to date. The lessor may send over a technician to the site on Oct. 1, 2016, who may note the reading of the counter 126 in his notebook.

The lessor may then send a technician to the site on Nov. 1, 2016 (or another date). FIG. 2 shows the machine 100 as it appears on Nov. 1, 2016. As can be seen, the counter 126 now reads 322,825. The technician may therefore determine that the machine 100 has been used to wash 1,399 racks in the last month (i.e., $\text{Counter}_{Nov.\ 1} - \text{Counter}_{Oct.\ 1} = 322{,}825 - 321{,}426 = 1{,}399$ racks from October 1 to November 1). The technician may convey the rack count to the lessor, who may then charge the lessee based at least in part on the rack count (e.g., charge for 1,399 racks at 10 cents per rack=$139.9).

As noted, a lessor may lease several dishwashing machines in different parts of the country, and may be forced to send technicians periodically to each site so that the counter 126 readings may be noted. If the lessee does not timely pay the monies owed (e.g., $139.9 in this example), the lessor may be forced to send a technician on site again, this time to disable the machine 100 (e.g., the technician may use a control panel on the machine 100 to electronically lock the machine 100, disconnect the power (or another) line within the control housing 120, or use a jumper, lock, and/or other means to preclude the machine 100 from being used to wash dishes). When the machine 100 is disabled and causes the lessee to suffer losses, the lessee may pay the lessor the monies owed so that the machine 100 may be enabled. The lessor may thus be forced to send a technician out to the site yet again to enable the machine 100. Such may take several days. The inability of the leased commercial dishwashing machines in the prior art to be remotely operated may thus cause much time and money and to be wasted.

Figure 3:
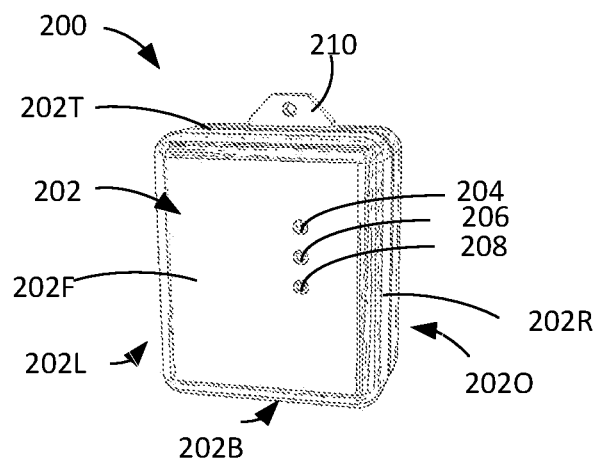
FIG. 3 is a front perspective view of a remote appliance control and monitoring unit, according to an example embodiment.

Attention is directed now to FIG. 3, which shows a remote appliance control and monitoring unit 200, according to an example embodiment. The remote appliance control and monitoring unit 200 may have a portable housing 202 having a front side 202F, a right side 202R, and a top side 202T. The housing 202 may also have a rear side 202O opposing the front side 202F, a left side 202L opposing the right side 202R, and a bottom side 202B opposing the top side 202T. The front side 202F (or another surface) may include indicators (e.g., LED lights which are configured to turn on or off and/or which light up in different colors, beeping alarms, et cetera). For example, as shown in FIG. 3, the front side 202F may include indicators 204, 206, and 208, as described in more detail below.

Figure 4:
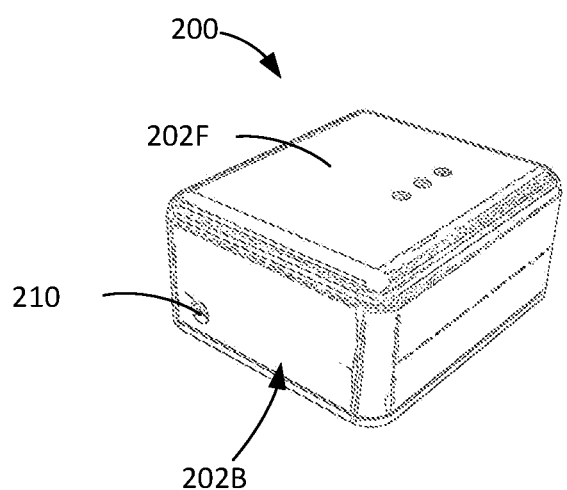
FIG. 4 is another perspective view of the remote appliance control and monitoring unit of FIG. 3.

As shown in FIG. 4, the bottom side 202B (or another surface of the housing 202) may include an opening 210. The opening 210 may be configured to allow the unit 200 to be electronically coupled (e.g., via one or more wires) to the prior art dishwashing machine 100. That is, in some embodiments, the prior art machine 100 may be retrofitted to include the appliance monitoring and control unit 200, as described herein. For example, the unit 200 may be electronically coupled to the machine 100 and be situated proximate the control housing 120; for instance, a handle 210 (FIG. 3) may be used to hang the unit 200 on the wall behind the control housing 120. In some embodiments, the housing 202 of the unit 200 may be secured to the control housing 120 itself (or may be secured to a different portion of the machine 100). In other embodiments still, the functionality of the unit 200 may be included in new machines (e.g., the control housing 120 may be supplied with the components of the unit 200, as described herein). As discussed herein, the unit 200 may leverage one or more systems existing in the prior art machine 100 to allow for the remote monitoring and operation of the machine 100.

Figure 5:
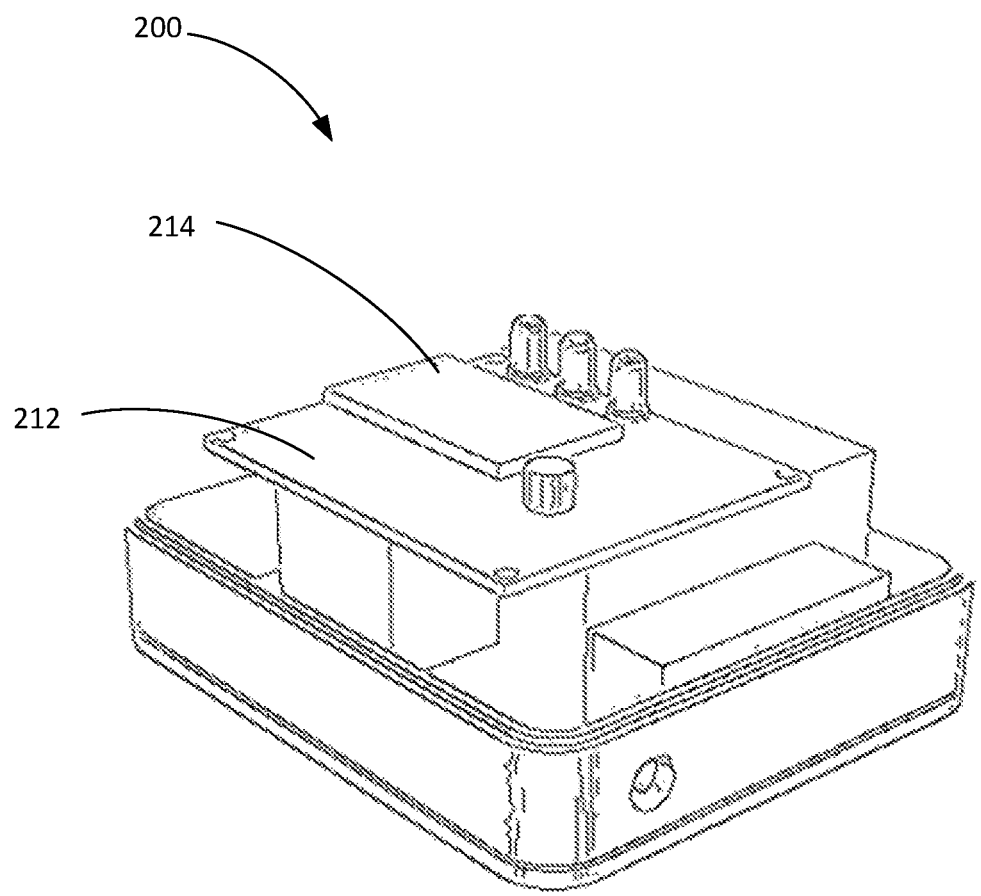
FIG. 5 is another perspective view of the remote appliance control and monitoring unit, with a portion of a housing thereof removed for illustrative purposes.

The housing 202 of the unit 200 may be configured to include one or more electronics (e.g., wires, switches, PCBs, traces, resistors, meters, memory, networking device, et cetera) to allow the unit 200 to function as described herein. In one embodiment, the housing 200 may include at least one PCB 212 (FIG. 5), one or more microprocessors 214, and a wired and/or wireless networking device (such as a WIFI switch or router). The microprocessor 214 may include or have access to transitory or non-transitory memory for storing programmable instructions, which may allow the unit 200 to perform certain functions as described herein.

Figure 6:
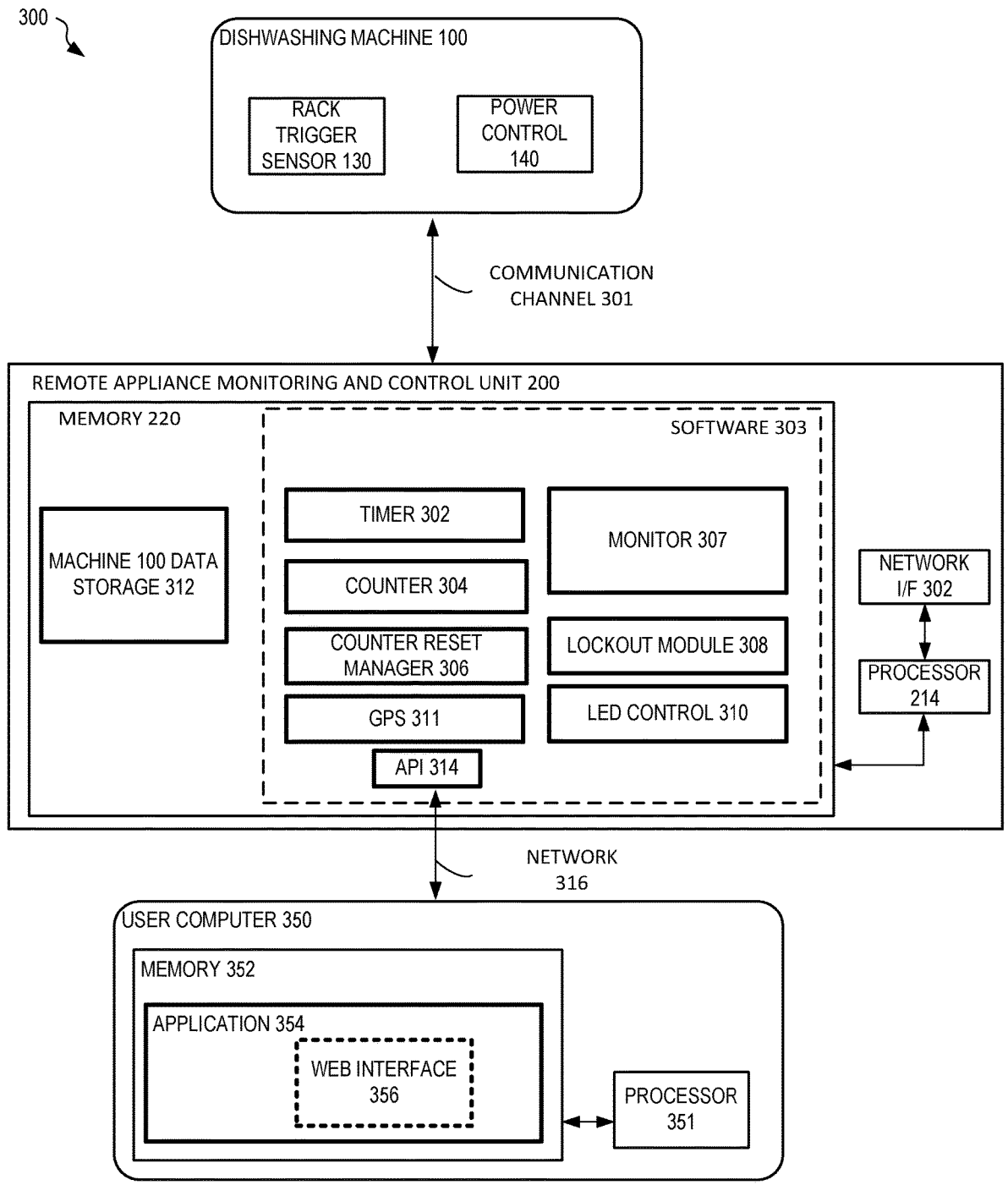
FIG. 6 schematically illustrates a system for monitoring and controlling an appliance remotely using the remote appliance control and monitoring unit of FIG. 3.

FIG. 6 schematically shows a remote appliance monitoring and control system 300. The example remote appliance monitoring and control system 300 includes the remote appliance and monitoring control unit 200, the dishwashing machine 100, and a user computer 350. As shown in FIG. 6, each of the user computer 350 and the dishwashing machine 100 may be communicatively coupled to the unit 200.

The dishwashing machine 100 (see FIGS. 1, 2) may include a rack trigger sensor 130 and a power control 140. The rack trigger sensor 130 may have associated therewith a meter (e.g., a meter coupled to the cycle on/off switch within the machine 100 as shown in FIG. 1) whose count is incremented each time a rack is run in the machine 100. The rack trigger sensor 130 may be triggered each time the dishwashing machine 100 is used to wash a new rack. The dishwashing machine 100 may also have a power control 140 (e.g., a switch that may be turned on and off to power the machine 100). In some embodiments, the power control 140 in the prior art machine 100 may allow the user (e.g., the lessor) to lock the machine 100 such that it cannot be used by the lessee without the lessor's intervention; for example, the power control 140 may include a password protected digital lock which, when activated, precludes operation of the machine 100.

The unit 200, as shown in FIG. 6, may be communicatively coupled to the machine 100 (e.g., via wiring, or via a wired and/or wireless communication channel 301). In a presently preferred embodiment, the unit 200 may be hard-wired to the dishwashing machine 100 (e.g., the rack trigger sensor 130 and the power control lines 140 may be used to provide inputs and/or outputs to the unit 200 directly coupled to the machine 100).

The unit 200 (see FIG. 3) may include the processor 214, which may be coupled to the memory 220 and a network interface 302. Network interface 302 may be implemented as one or both of a wired network interface and a wireless network interface, as is known in the art, though in a currently preferred embodiment, the network interface 302 is implemented as a wireless network interface. Memory 220 represents one or more of volatile memory (e.g., RAM) and non-volatile memory (e.g., ROM, FLASH, magnetic media, optical media, et cetera). Although shown within unit 200, memory 220 may be, at least in part, implemented as network storage that is external to structure 200 and accessed via network interface 302.

The memory 220 of the unit 200 may include software 303. The software 303 may include machine readable instructions that may be implemented by the processor 214 to allow the unit 200, and the system 300, to function as described herein. For example, in an embodiment, the software 303 may include a timer 302, a counter 304, a counter reset manager 306, a monitor 307, a lockout module 308, and an LED control module 310. The memory 220 may include, e.g., in a transitory and/or a non-transitory portion of the memory 220, a storage area 312.

The unit 200, via an application programming interface 314 and over a network 316 (e.g., a WI-FI Internet network and/or a wired network), may be configured to communicate with a user computer 350. In a presently preferred embodiment, the dishwashing machine 100 and the unit 200 coupled thereto may be located on site (e.g., in a restaurant, bar, hotel, nursing home, et cetera), whereas the user computer 350 may be remote therefrom (e.g., in an office of the lessor). The user (e.g., the lessor) may use the user computer 350 to communicate with the dishwashing machine 100 remotely over the network 316 via the unit 200.

The user computer 350, which may be a desktop, a laptop, a smart phone, et cetera, may, as is known, include a memory 352 coupled to a processor 351. The memory 352 may include an application (or other software) 354 having an interface (e.g., a web interface) 356. The user (e.g., the entity from whom the machine 100 is leased) may remotely monitor and control the working of the machine 100 using the web interface 356. The web interface 356 may, for example, be accessible over a website, which may be password protected and/or encrypted. Alternately, or in addition, the web interface 356 may be accessed via an application (e.g., a mobile application) on a smart phone.

The timer module 302 may be configured to determine the duration (e.g., seconds, minutes, hours, et cetera) for which the machine 100 has been in a particular state. For example, the timer 302 may keep track of the time for which the machine 100 has been powered on, and of the time for which the machine 100 has been used to wash dirty dishes. The data retrieved from the timer 302, and the other data in the memory 220, may be accessed by the user remotely via the user computer 350. For example, if the lessee complains that the machine 100 is not powering on, the lessor may check same from his location without having to send a technician out on site. In embodiments, the unit 200 may be communicatively coupled to a timer motor of the dishwasher 100 that enables the timer 302 to determine the duration for which the machine 100 has been in a particular state. In embodiments, the unit 200 may be coupled to a timer motor of the dishwashing machine 100 to enable the timer 302 to determine the durations for which the machine 100 is in a particular state.

The counter 304 may be electronically and/or mechanically coupled to the counter 126 (FIG. 1) of the machine 100. That is, the counter 304 of the unit 200 may, in an embodiment, employ existing mechanisms in the machine 100 as a trigger, which may save costs (as compared to sensing a rack being washed anew). For instance, the counter 304 may be wired to the line providing impulses to the counter 126 of the prior art machine 100. The counter 304 may thus keep track of the number of racks for which the machine 100 has been used, and the user may be able to remotely determine same using the web interface 356. Unlike the counter 126 of the machine 100, which counts only the total number of racks, the counter 304 may allow the user to use the web interface 356 to determine the workings of the machine 100 in additional detail. For example, the user may use the web interface 356 to determine the total number of racks the machine 100 has been used for in a day, in a week, in a month, in a year, et cetera. Reception of the rack counts remotely may eliminate the need for the user (e.g., dealer) to send out his technicians on site every so often to determine the rack counts.

In some embodiments, the counter data 304 may be sent to the user periodically and automatically (e.g., an e-mail may be sent to the user outlining the rack counter 304 readings for the machine 100 and of other machines). Alternately, or in addition, the user may use the web interface to receive the rack counts (and other data described herein) on command. The counter reset manager 306 may allow for the counter 304 data to be reset (e.g., once every month if the payment for the lease is due on a monthly basis, or at another time). While not required, in some embodiments, the unit 200 may have a display (e.g., an LED display, a touch screen, et cetera) which displays the current count on the counter 304.

The web interface 356 may be robust and may allow for the rack counter 304 data (and other data, e.g., the timer 302 data) to be used for analytics. For example, the web interface 356 may graphically arrange the data so as to provide intuitive historical rack counts from the last year, the last month, the last week, et cetera, which may indicate that the site sees more dirty dishes on particular days, weeks, or months. In some embodiments, the timer 302 may be associated with the particular time zone (e.g., Central, Mountain, Pacific, et cetera) in which the site (i.e., the machine 100) is located, and each rack count from the counter 304 may include a time stamp outlining when the rack was run. Such may allow the usage of the machine 100 to be evaluated with more granularity. In some embodiments, the user (i.e., lessor) may ship to the lessee cleaning compounds based on the counter data (e.g., if the lessor ships cleaning compounds to the lessee once a month, but the rack counts indicate that the lessee is likely to run out of cleaning compounds a week early, the lessor may ship the cleaning compounds to lessee ahead of time to minimize the down time and losses that the lessee would otherwise suffer). The counter 304 data may likewise be used for maintenance or repair. For example, instead of sending out technicians to perform maintenance or repair on the machine 100 every periodically (e.g., every six months), the lessor may send technicians to perform maintenance or repair when the counter 304 data indicates that, based on the actual usage of the machine 100, such maintenance is due.

The monitor 307 may be configured to monitor at least one attribute of the machine 100. In an embodiment, the monitor 307 may be a temperature monitor configured to monitor the sanitation temperatures of the machine 100. In embodiments, the temperature monitor 307 of the unit 200 may be communicatively coupled to a sensor of the dish machine 100 that is configured to monitor the air and/or water temperatures of the machine 100. The temperature data collected by the monitor 307 may, in embodiments, be transmitted to the user computer 350 and displayed on the web interface 356. Such may allow the user to remotely ensure that the dish washing machine 100 is working as intended, e.g., is not overheating, is regulating the temperatures of the wash cycles appropriately, etc. If the user determines via the user computer 350 that the machine 100 has a defect (e.g., the dishes are not being washed at the appropriate temperature), the user may send out a technician to the site to repair the machine 100 as required.

Alternately or additionally, in embodiments, the monitor 307 may include a different monitor (e.g., a monitor other than or in addition to a temperature monitor). As is known, some dishwashing machines 100 may include sensors (e.g., a soil sensor, a turbidity sensor, a water hardness sensor, a dirt sensor, a load sensor, etc.) that take various measurements prior to, during, and/or after the wash cycles to ensure the proper operation of the machine 100. In embodiments, the unit 200 may be communicatively coupled to one or more such sensors, and the monitor 307 may be configured to monitor the output of same to ensure that the machine 100 is working as desired. In embodiments, where one or more such sensors provide an abnormal reading, the monitor 307 may detect same and generate an automatic alert that is transmitted to the user computer 350. The user (e.g., lessor) may thus be automatically apprised of a potential defect in the machine 100 and may take an action (e.g., send out a technician) to remedy same.

In some embodiments, the unit 200 may include a global positioning system module 311 and associated software and hardware. The global positioning system 311 may outline the location (e.g., latitude and longitude, street address, et cetera) of the unit 200—and thereby the location of the machine 100 to which the unit 200 is coupled. In some embodiments, the location data may be remotely transmitted to the user computer 350 (e.g., the lessor may be able to access the location data on command via the web interface 356 and/or the location data may be appended to the counter data from the counter 304 that is transmitted to the user computer 350). Such may help a lessor keep track of the unit 200 and the machine 100, particularly where the lessor leases out multiple machines in different parts of the country. The location data may further ensure that assets shipped to the lessee (e.g., cleaning compounds transported to the lessee via a third party trucking company) timely arrive at the proper destination. In some embodiments, the GPS 311 may be omitted but the technician setting up the unit 200 may transmit the location data (determined, e.g., using a smart phone or external GPS device) to the lessor so the location data can be used (e.g., for the purposes set forth above). In some embodiments, the location data (determined using an external device, for example) may become part of the data that is transmitted from the unit 200 to the user computer 350.

In some embodiments, in addition to or in lieu of the GPS data (which may identify a particular unit 200 coupled to a particular machine 100), the data transmitted by the unit 200 to the user computer 350 may include an identification number associated with the particular unit 200. The user (e.g., the lessor) may be able to use the web interface 356 (or other application) to uniquely access the data (e.g., data from counter 304) for a particular unit 200 using the identification number (such as a serial number) of that unit 200. The identification number may be a numeric or alphanumeric code, for example. In some embodiments, the identification number may embed, for instance, the name or other identifying characteristic of the entity to which the machine 100 is leased. In some embodiments, the user may be able to accumulate the information associated with all, or a particular subset, of the units 200 (for e.g., the user may be able to view, at the same time, the data from the counter 304 of all machines 100 that washed over 10,000 racks last month; or, for instance, the user may be able to collate the data from all machines 100 leased to a particular entity).

Some lessees may, in their leases with the lessors, have a maximum rack count. For example, a lease may specify that the lessee will use the machine 100 for no more than 10,000 racks a month. In the prior art, the lessor may thus have to send technicians to the site to determine whether the maximum rack count has been exceeded, and if so, to lock out the machine (or the user may lock out the machine 100 if the lessee has not exceeded the maximum rack count but has failed to timely pay the lease fees). The lessee may then pay the monies owed, and the lessor may send a technician out to the site yet again to allow the machine 100 to be used, which may be cumbersome.

The unit 200 may allow the machine 100 to be locked out, and unlocked, remotely. That is, the user may use the computer 350 and the interface 356 to cause the lockout module 308 to remotely lock the machine 100 on command. Where the prior art machine 100 includes an electronic locking mechanism (e.g., where a control panel of the prior art machine 100 can be used to lock the machine), the unit 200 may leverage same (e.g., provide a trigger to the control unit to cause the machine 100 to be electronically locked and unlocked). In some embodiments, the lockout module 308 may be configured to lock the machine 100 if the maximum rack count (or another rack count) is exceeded. For example, the user may use the web interface 356 to automatically lock the machine 100 if the machine 100 is used for more than 10,000 (or a different number of) racks in two weeks (or a different length of time).

In some embodiments, the lockout module 308 may be tied to a payment processing system; for example, the lockout module 308 may automatically lock the machine 100 if it determines that monies owed for use of the machine have not been timely paid, and unlock the machine 100 automatically where the requisite payments are made via the payment processing system. Such may save the user (i.e., the lessor) much time and effort.

In some embodiments, the user (e.g., the lessor) may be able to share some or all of the pertinent data with the lessee (e.g., a restaurant operator). For example, if the restaurant operator complains that the bill for a month has been improperly calculated, the lessor may be able to share the data gleaned using the unit 200 with the restaurant operator. In some embodiments, the lessor may share the data with the lessee as part of the lease contract, which may enable the lessor to stand out from other lessors. For example, in some embodiments, the user may forward, or the unit 200 may automatically transmit the day's (or the week's, the month's, et cetera) rack count to the lessee periodically. In some embodiments, the unit 200 may be manufactured (and/or installed) by a third party who may lease the unit 200 for a monthly fee, or sell the unit 200 (e.g., to the lessor of the machine 100). In these embodiments, the lessor of the machine 100 may be able to outsource much of the work involved in maintaining and obtaining the requisite payments for the machines 100.

As noted, the unit 200 may include indicators 204, 206, and 208. In some embodiments, the indicators 204, 206, and 208 may indicate that the machine 100 (and/or the unit 200) is functioning as intended, or signal an abnormal condition. For example, the indicator 204 may turn green (or a different color) to indicate that the unit 200 is powered on. The indicator 206 may turn green (or a different color) to indicate that the unit 200 is in a wireless operative zone of the network 316. The indicator 208 may turn green (or a different color) if the unit 200 is used to lock the machine 100. The indicators 204-208 may in embodiments illuminate in a different color (e.g., red, or may turn off) to indicate that the machine 100 is powered off, is not in WI-FI communication, and/or is unlocked, et cetera. In some embodiments, one or more of the indicators 204-208 may include audible indicators (e.g., the indicator 204 may beep to apprise the lessee that a rack is being washed).

By monitoring and controlling the machine 100 automatically via the unit 200, both the lessor and lessee save time and money. Specifically, as noted, the lessor saves time and money because he no longer has to send out technicians to physically visit each site on which a machine 100 is located (e.g., to check the rack counts, to lock the machine, to unlock the machine, to perform maintenance before its due, et cetera). Similarly, the lessees benefit because the lessor's technicians are not clogging up the kitchen (or other room where the dishwasher 100 is located) periodically, and because, in embodiments, the lessee may be assured that the lessor will ship it cleaning compounds in line with the lessee's usage of the machine 100.

The lessor may also use the system 300 to monitor parts of the machine 100. For example, squeeze tubes in the machines 100 may need to be replaced after a certain number of cycles, and the lessor may use the data obtained via the unit 200 to ensure that these tubes are timely replaced. In some embodiments, the web interface 356 may include additional information about the machine 100 (such as its specifications, the recommended cleaning solutions, automated maintenance alerts, et cetera).

While FIG. 6 shows one unit 200 coupled to one dishwashing machine 100, the artisan will readily appreciate that the disclosure is not so limited. For example, the user computer 350 may likewise be used to communicate with multiple (e.g., ten, hundred, thousand, et cetera) units 200 that are each coupled to a distinct dishwashing machine 100. In some embodiments, the machine data storage 312 may communicate with an external database (e.g., a server and/or the cloud) so that all data regarding all machines 100 coupled to respective units 200 is stored and conveniently accessible at the same time using a solitary user computer 350. This data may be used for several purposes. The user (i.e., lessor) may use this data to set pricing per rack for its various lessees, and to select preferred lessees (e.g., automatically track which lessees pay on time, use the machine 100 as desired such that the machines 100 do not break down intermittently, et cetera). The data may further be used to ascertain, for instance, the durability of a particular brand of machine 100, and when to replace an old machine 100 with a new machine based on the old machine's usage.

In some embodiments, the unit 200 may have a safe mode. For example, where the network 316 is down such that it cannot be controlled via the remote computer 350, the unit 200 may go into safe mode and save the associated data in the storage 312; the unit 200 may then transmit the stored data to the user computer 350 (directly, or indirectly, e.g., via the cloud or remote server) when connectivity with the wireless network 316 is reestablished. In some embodiments, the lockout module 308 may automatically lock the machine 100 where the wireless network 316 is down, or is down for an extended period of time (e.g., 24 hours).

In this way, thus, the user may conveniently monitor and control the operation of the machine 100 remotely and efficiently. While the disclosure focuses on the dishwashing machine 100, the artisan will appreciate from the discussion herein that the unit 200 may likewise be used to remotely monitor and control other commercial appliances that are offered for lease. For instance, in an embodiment, the unit 200 may be electronically coupled to an ice machine which a hotel has leased from the lessor (i.e., a user of the system 300); and may allow the user to lock the ice machine remotely (or even automatically) if the hotel does not timely pay the user.

As noted above, the unit 200 may be situated as desired (e.g., adjacent or otherwise proximate the machine 100, inside the control unit 120, et cetera). The machine 100 may be made of stainless steel (or other construction material) that blocks (or otherwise interferes) with the Wi-Fi signal being received at the network interface 302. In some embodiments, therefore, the unit 200 may include a Wi-Fi antenna (e.g., to attain or boost reception). In some embodiments, the Wi-Fi antenna may be internal to the unit 200 (e.g., situated within the housing of the unit 200). In other embodiments, the antenna may be outside the housing of the unit 200 (e.g., the antenna may be mounted on the back, top, or other surface of the housing 102H of the dish machine 100 and may be coupled to the PCB 212 (FIG. 5) via an RF cable that passes through the opening 210).

Figure 7:
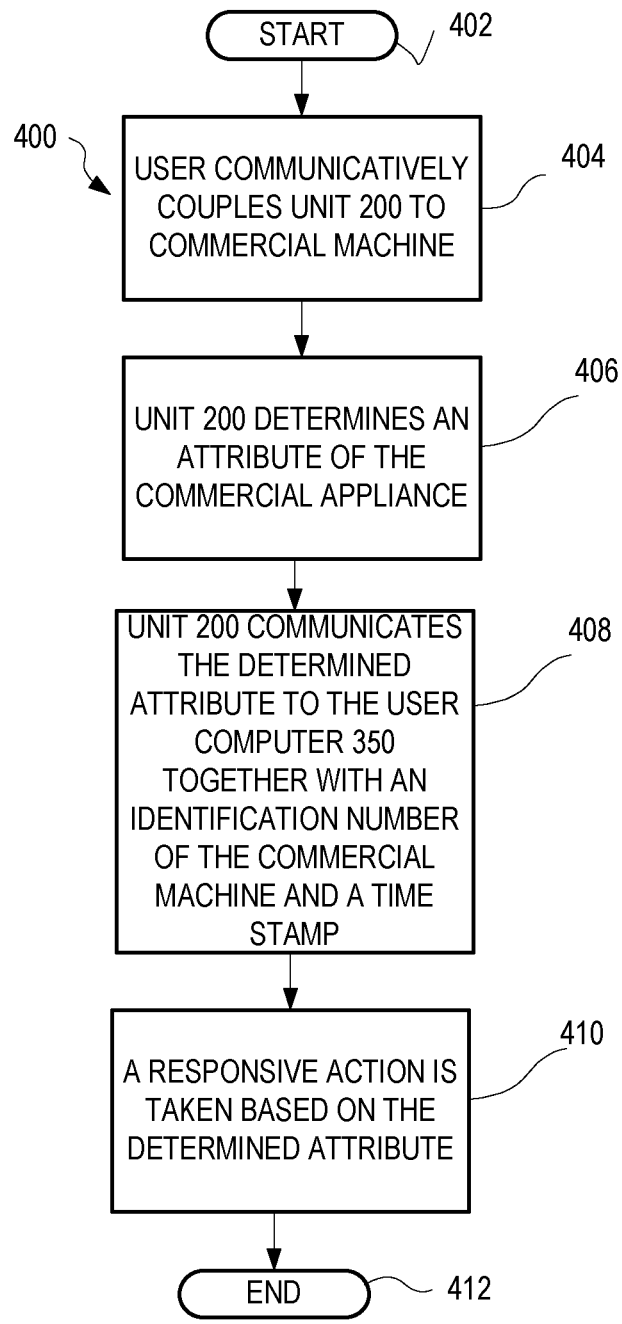
FIG. 7 is a flowchart illustrating an example method of using the remote appliance control and monitoring unit, in an embodiment.

FIG. 7 shows an example method 400 of using the unit 100 to remotely monitor and control a commercial appliance.

The method 400 may begin at block 402. At block 404, the user (e.g., a lessor who leases the commercial machine to a lessee) may communicatively couple the unit 200 to the commercial machine. For example, the user may hardwire and/or otherwise communicatively couple the unit 200 to the dishwashing machine 100, an ice machine, or other commercial appliance. As noted, block 404 may, in embodiments, include leveraging one or more preexisting systems of the commercial appliance. For example, where the commercial appliance is the dishwasher 100, block 404 may involve coupling the unit 200 to the dishwasher 100 such that the rack trigger counter sensor 130, power control 140, and/or other sensor (e.g., temperature sensor, turbidity sensor, soil sensor, etc.) of the machine 100 provides an input to the unit 200.

At block 406, the unit 200 may determine one or more attributes of the commercial appliance (e.g., of the machine 100 in this example). For example, the unit 200 may determine the rack count of the machine 100, the duration for which the machine 100 has been in a particular state, the temperature of the sanitation cycles of the machine 100, the sanitation tube usage, et cetera. The determination of the attribute may be automatic (e.g., may be conducted periodically or in response to a condition, such as the powering on of the machine 100), and/or maybe effectuated based on user command. For instance, in an embodiment, the unit 200 may determine an attribute of the machine 100 in response to an input provided by the user via the web interface 356.

At block 408, the determined attribute may be communicated over the network 316 to the user computer 350 directly and/or indirectly (e.g., via the cloud or other storage that is accessible to the computer 350). For example, where the determined attribute is the rack count, this count may be communicated to the user computer 350 remote from the machine 100. The user may thus be able to view this attribute over the web interface 356. The communication of the attribute by the unit 200 to the computer 350 may, in embodiments, be automatic (e.g., periodic). In other embodiments, the communication may be initiated by the user using the web interface 356.

In embodiments, the determined attribute may include an identification number (e.g., a unique alpha-numeric, numeric, or other string identifying the commercial machine) and a time stamp indicating the time at which the attribute was determined.

At block 410, an action may be taken in response to the determination of the attribute by the unit 200. As discussed above, the responsive action may be automatic or may be initiated by the user. For instance, in an embodiment, where the determined attribute indicates that the lessee has exceeded a maximum rack count, the responsive action may include locking the machine 100 automatically. Or, for example, where the determined attribute indicates that the lessee is likely out of dishwasher fluids, the lessor may send dishwasher fluids to the lessee so that the machine operation is not unduly impacted. In some embodiments, the responsive action may include using the unit 200 to automatically alert a technician (e.g., via e-mail, text, web interface 356 or other means) that the machine 100 is not operating as intended. The method may then end at block 412.

In this way, thus, the unit 200 may allow the operation of any commercial machine (e.g., dishwasher 100) to be remotely monitored and controlled.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations. Not all steps listed in the various figures need be carried out in the specific order described.

The invention claimed is:

1. A method for remotely monitoring and operating a dishwashing machine, comprising:
   providing a remote appliance monitoring and control unit, comprising:
      a portable housing having an indicator;
      a wireless network interface;
      a processor; and
      a memory having machine readable instructions configured to be executed by said processor to:
         determine an attribute of said dishwashing machine; and
         control said indicator based on said determination of said attribute;
   electronically coupling said unit to each of a rack trigger sensor and a power control line of said dishwashing machine;
   using said unit to determine a rack count of said dishwashing machine
   causing said unit to wirelessly communicate said rack count to a remote user computer together with a geographic location of said dishwashing machine;
   remotely locking said dishwashing machine using said unit based on said communicated rack count; and
   remotely unlocking said dishwashing machine using said unit in response to receipt of a payment associated with said communicated rack count.

2. The method of claim 1, wherein said unit further monitors and wirelessly communicates a temperature of said dishwashing machine.

3. The method of claim 2, wherein said unit automatically locks said dishwashing machine in response to a network outage.

4. The method of claim 1, wherein said unit automatically locks said dishwashing machine when a duration of a network outage is exceeded.

5. The method of claim 4, further comprising communicating to said remote computer a time stamp indicating a time at which the rack count was determined by said unit.

6. The method of claim 5, wherein said indicator includes a plurality of light emitting diodes.

7. The method of claim 1, wherein said indicator is configured to change colors based on an operational state of said dishwashing machine.

8. The method of claim 7, wherein said indicator includes an audible indicator.

9. The method of claim 1, further comprising storing said rack count in said memory.

10. A method for remotely monitoring and operating a dishwashing machine, comprising:
    providing a remote appliance monitoring and control unit, comprising:
       a portable housing;
       a network interface;
       a processor; and
       a memory having machine readable instructions configured to be executed by said processor to determine an attribute of said dishwashing machine;
    electronically coupling said unit to each of a rack trigger sensor and a power control line of said dishwashing machine;
    using said unit to determine a rack count of said dishwashing machine;
    causing said unit to communicate said determined rack count to a remote user computer;
    remotely locking said dishwashing machine using said unit based on said communicated rack count; and
    remotely unlocking said dishwashing machine using said unit.

11. The method of claim 10, further comprising associating said unit with a payment processing system.

12. The method of claim 11, wherein said dishwashing machine is automatically unlocked in response to a payment made to the payment processing system.

13. The method of claim 10, wherein said unit further monitors and wirelessly communicates a temperature of said dishwashing machine.

14. The method of claim 10, wherein said unit automatically locks said dishwashing machine in response to a network outage.

15. The method of claim 10, wherein said unit automatically locks said dishwashing machine when a duration of a network outage is exceeded.

16. A method for remotely monitoring and operating a dishwashing machine, comprising:
    providing a remote appliance monitoring and control unit, comprising:
       a portable housing;
       a network interface;
       a processor; and
       a memory having machine readable instructions configured to be executed by said processor to determine an attribute of said dishwashing machine;
    electronically coupling said unit to a rack trigger sensor of said dishwashing machine;
    using said unit to determine a rack count of said dishwashing machine;
    causing said unit to communicate said determined rack count to a remote user computer;
    remotely locking said dishwashing machine using said unit based on said communicated rack count; and
    remotely unlocking said dishwashing machine using said unit.

* * * * *